Figure 5:
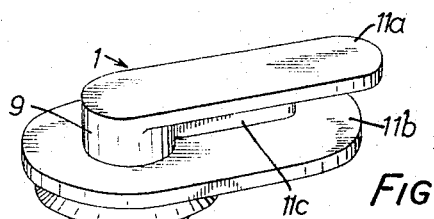

Sept. 6, 1966  A. S. PEARSON  3,271,059
CLIP FOR FASTENING TOGETHER TWO APERTURED PANELS
Filed Feb. 17, 1964  2 Sheets-Sheet 1
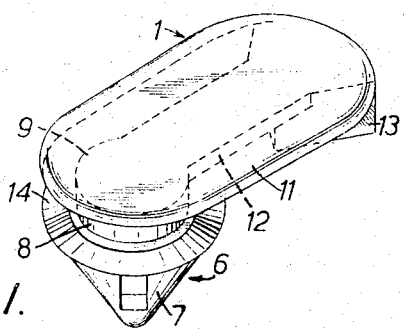
FIG. 1.
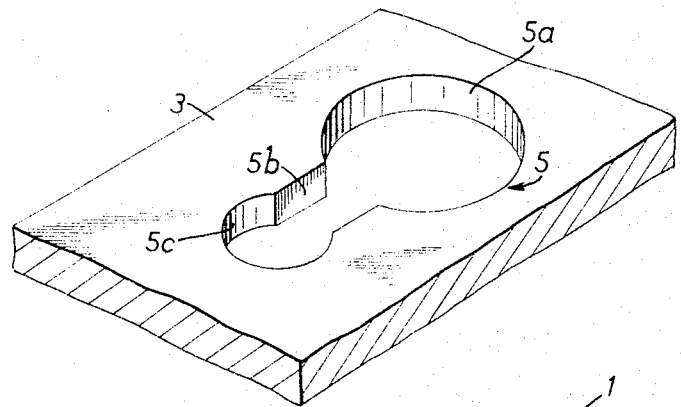
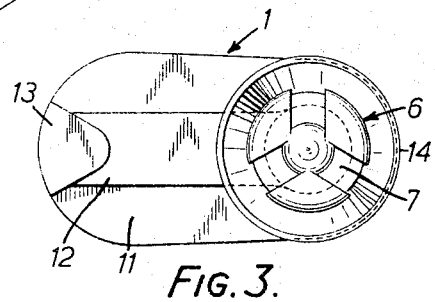
FIG. 2.  FIG. 3.
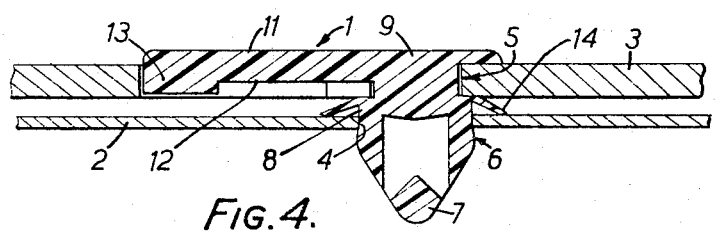
FIG. 4.
INVENTOR
ARTHUR STANLEY PEARSON,
BY Philip E. Parker
ATTORNEY Sept. 6, 1966  A. S. PEARSON  3,271,059
CLIP FOR FASTENING TOGETHER TWO APERTURED PANELS
Filed Feb. 17, 1964  2 Sheets-Sheet 2

INVENTOR
ARTHUR STANLEY PEARSON,
BY Philip E. Parker
ATTORNEY

United States Patent Office 3,271,059
Patented Sept. 6, 1966

3,271,059
CLIP FOR FASTENING TOGETHER TWO APERTURED PANELS
Arthur Stanley Pearson, Sherwood, England, assignor to United-Carr Incorporated, a corporation of Delaware
Filed Feb. 17, 1964, Ser. No. 345,443
Claims priority, application Great Britain, Feb. 22, 1963, 7,287/63
3 Claims. (Cl. 287—189.36)

This invention relates to a clip for fastening together two apertured panels.

According to the present invention a clip for fastening together two panels, the first panel having an aperture and the second panel having an elongated slot, is formed of resilient material and comprises a stud-like member for snapping engagement in the aperture in the first panel and an integral arm extending radially away from the stud-like member, the configuration of the clip being such that it is slidable into assembled position in the slot in the second panel with the stud-like member abutting at one end of the slot and a rib on the arm extending into and abutting the opposite end of the slot to prevent movement of the clip in the plane of the second panel, flanges being provided on the clip for engaging opposite faces of the second panel and preventing movement of the clip perpendicular thereto, and the stud-like member being receivable in snapping engagement in the aperture in the first panel to fasten the two panels together in substantially parallel relationship.

In a first embodiment of the invention the stud-like member has a neck portion of reduced diameter between the head of the stud and the arm, and the radially outermost end of the arm carries a peg projecting in the direction of the head of the stud, the clip being receivable in a slot shaped in plan like a dumb-bell with unequal ends by insertion of the head of the stud through the larger end of the slot followed by sliding movement of the clip to snap the stud-like member into the smaller end of the slot, the walls of the groove engaging the opposite faces of the second panel and the peg snapping into the wider end of the slot to abut the end wall thereof when the stud abuts the wall at the narrow end of the slot.

In a second embodiment the arm consists of two parts, separated in a direction axial with respect to the stud-like member and having a rib perpendicular to the two parts of the arm and linking them for at least part of their extent outwardly from the stud, the arrangement being such that the arm is insertable into the wide end of a keyhole-shaped slot in a panel with the head of the stud pointing away from the panel, and the clip may then be slid into position with the rib extending along the narrow parts of the slot and the stud located in the wide part of the slot, the facing surfaces of the two parts of the arm abutting the opposite faces of the panel to prevent movement of the clip perpendicular thereto.

Either of the embodiments may have a resilient flange on the stud for making sealing engagement with the panel, and the stud may be divided into segments for added resilience.

Figure 6:
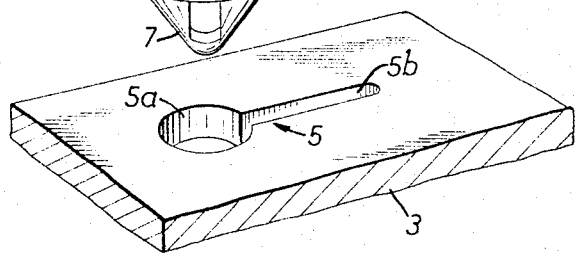
Figure 7:
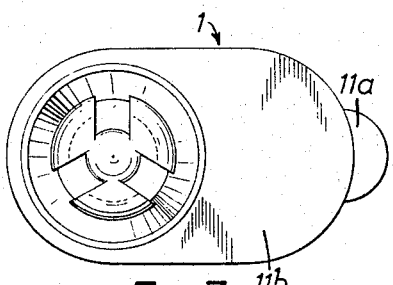
Figure 8:
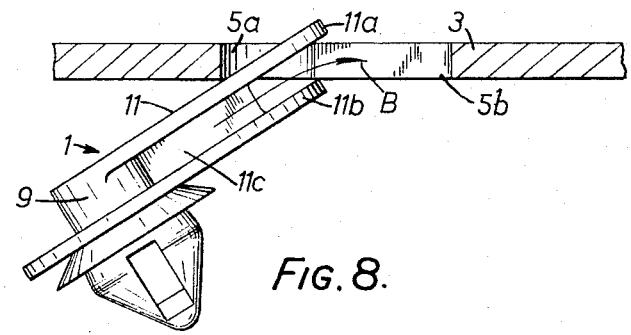

The invention will now be described with reference to the accompanying drawings of which:

FIG. 1 is a perspective view of a clip assembled with a slotted panel according to one embodiment of the invention, FIG. 2 is a side view of the clip shown in FIG. 1, FIG. 3 is an underneath view of the clip shown in FIG. 1, FIG. 4 is a longitudinal cross-section of a clip as shown in FIGS. 1–3 in position in two panels connected by the clip, FIG. 5 shows a second embodiment of the invention together with a slotted panel, in perspective, FIG. 6 is a side view of the clip shown in FIG. 5, with the panels indicated in section, FIG. 7 is an underneath view of the clip shown in FIGS. 5 and 6, and FIG. 8 is a side view of the clip shown in FIGS. 5 to 7 being inserted into position in a slotted panel, the panel being shown in section.

Referring now to FIGS. 1 to 4, the clip generally designated 1 is used to fasten together the two panels 2 and 3. Panel 2 has a circular aperture 4, while panel 3 has a dumb-bell shaped slot generally designated 5 and which consists of a large end 5a connected by a waist portion 5b to a small end 5c.

The clip 1 is formed of resilient plastics material and comprises a stud-like portion generally designated 6 which consists of a tapered portion 7, a central portion 8, and an upper portion 9. The upper portion has a neck portion 10, of reduced diameter of the size of the aperture 5c and an arm 11 extends radially from the upper portion 9 of the stud-like portion 6. The arm 11 has a rib 12 and a peg 13, both of which project from the arm in the same direction as the tapered portion 7 of the stud-like portion. The stud-like portion 6 carries an annular flange 14, the purpose of which will be described later.

The tapered portion 7 of the stud-like member is formed with axial slots defining resilient segments to enable the stud to make snapping engagement with the aperture 4 in panel 2.

In use the clip 1 is advanced toward the panel 3 in the way shown in FIG. 1 and the stud-like portion is pushed as far as possible through aperture 5a. When in this position, the clip is pushed in the direction of aperture 5c. Since the diameter of the neck portion 10 is substantially identical to the diameter of aperture 5c and the length of the neck portion is substantially equal to the thickness of panel 3, the central portion 8 of the stud 6 will by virtue of its resilience snap through the aperture 5b and into place in 5c. As the clip snaps home, the rib 12 and the peg 13 will snap downwardly into apertures 5b, 5a, respectively.

When the clip is in this assembled position relative to panel 3 the opposed flanges at either end of neck portion 10 abut the opposite faces of the panel to prevent movement of the clip perpendicular thereto, and the portion 8, rib 12 and peg 13 fit into apertures 5c, 5b and 5a respectively to prevent movement of the clip in the plane of the panel 3.

When the clip is assembled to panel 3, the whole assembly is then presented to panel 2 so that the tapered portion 7 of the stud 6 enters aperture 4. Further pressure snaps the stud 6 into position in aperture 4, whereupon the panels 1 and 2 are held together by the clip, and flange 14 makes resilient sealing engagement with panel 2 around the aperture 4.

Referring now to FIGURES 5 to 8, and using corresponding numerals to those in FIGURES 1 to 4 where applicable, the clip, generally designated 1, is used to fasten together the two panels 2 and 3. Panel 2, and the lower and tapered portions of the stud member 6 are identical to those shown in FIGS. 1 to 4 and will not be described further.

Panel 3 has a keyhole shaped slot generally designated 5, having a circular part 5a and a communicating longitudinal part 5b.

The stud has no neck portion corresponding to that shown in FIGS. 1 to 4, but the arm 11 is in two parts 11a and 11b joined by a rib 11c. The distance between the opposed faces of 11a, 11b is substantially equal to the thickness of panel 3, while the shape of the slot 5 is substantially identical to the cross sectional outline of the clip taken on the line AA in FIG. 6.

In use the clip is presented to panel 3 as shown in FIG. 8 and is pushed as indicated by the arrow B in that figure. Since the part 11b is too wide to pass through the slot 5 the clip will deform as it is pushed and will move into snapping engagement with panel 3, as indicated in FIG. 6.

Since the parts 9 and 11c fit snugly into the parts 5a, 5b respectively of aperture 5, the clip cannot move in the plane of the panel 3, while the parts 11a, 11b prevent movement of the clip perpendicular to the panel.

Attachment of the clip to panel 2 is analogous to that described in connection with FIGURES 1 to 4.

The invention is particularly adapted for securing a trim pad panel to an apertured support such as a panel like portion of the body of a motor vehicle but is not limited to this particular use.

I claim:

1. A clip for fastening together two panels, the first panel having an aperture and the second panel having an elongated slot, said clip formed of resilient material and comprising a stud-like member for snapping engagement in the aperture in the first panel and an integral arm extending radially away from the stud-like member, and said stud-like member having a neck portion of reduced diameter between the head of the stud and said arm and the radially outmost end of said arm carrying a peg projecting in a direction of said head of said stud, the configuration of the clip being such that it is slidable into assembly in said slot in the second panel with the stud-like member abutting at one end of the slot and a rib extending from said arm extending into and abutting the opposite end of said slot to prevent movement of the clip in the plane of the second panel, said slot being shaped in plan like a dumbbell with unequal ends, flanges being provided on the clip for engaging into opposite faces of the second panel and preventing movement of the clip perpendicular thereto, and said stud-like member being receivable in snapping engagement in the aperture in the first panel and said peg snapping into the wider end of the slot, to abut the end wall thereof, when the stud-like member abuts the wall of the narrow end of the slot.

2. A clip as set forth in claim 1 wherein the stud-like member carries a resilient flange which in use makes sealing engagement with the panel to which the said stud is assembled.

3. A clip as set forth in claim 2 in which said stud-like member is divided into segments.

References Cited by the Examiner
UNITED STATES PATENTS 2,983,008  5/1961  Von Rath.
3,119,476  1/1964  Pearson _____ 52—403

HARRISON R. MOSELEY, *Primary Examiner.*

REINALDO P. MACHADO, *Examiner.*

P. M. CAUN, *Assistant Examiner.*